United States Patent
Hu et al.

(10) Patent No.: US 9,819,295 B2
(45) Date of Patent: Nov. 14, 2017

(54) TIME CONTROL SYSTEM AND TIME CONTROL METHOD FOR MULTIPLE MOTORS

(71) Applicants: Xiaofei Hu, Shenzhen (CN); Hongxing Wang, Shenzhen (CN); Yao Wang, Shenzhen (CN)

(72) Inventors: Xiaofei Hu, Shenzhen (CN); Hongxing Wang, Shenzhen (CN); Yao Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/283,512

(22) Filed: Oct. 3, 2016

(65) Prior Publication Data

US 2017/0110990 A1    Apr. 20, 2017

(30) Foreign Application Priority Data

Oct. 14, 2015  (CN) .......................... 2015 1 0665543
Jun. 24, 2016  (JP) ................................. 2016-126087

(51) Int. Cl.
 *H02P 7/00* (2016.01)
 *H02P 25/032* (2016.01)
 *H02P 5/74* (2006.01)

(52) U.S. Cl.
 CPC .............. *H02P 25/032* (2016.02); *H02P 5/74* (2013.01)

(58) Field of Classification Search
 CPC  H04R 2460/13; H04R 2499/11; H04R 1/028; H04M 1/05; H04M 1/03
 See application file for complete search history.

(56) References Cited

U.S. PATENT DOCUMENTS

| | | | |
|---|---|---|---|
| 2010/0327766 A1* | 12/2010 | Recker | H02J 9/02 315/291 |
| 2011/0260657 A1* | 10/2011 | Choi | B06B 1/162 318/114 |
| 2011/0260996 A1* | 10/2011 | Henricson | G06F 3/016 345/173 |
| 2014/0148217 A1* | 5/2014 | Tam | H04M 19/047 455/556.1 |

* cited by examiner

*Primary Examiner* — Shawki S Ismail
*Assistant Examiner* — Zoheb Imtiaz
(74) *Attorney, Agent, or Firm* — Na Xu; IPro, PLLC

(57) ABSTRACT

A time control system for multiple motors is provided in the present disclosure. The time control system includes an event generating module for generating event information corresponding to an event, a control module for analyzing the event information, a signal selecting module for selecting vibrating information according to the event information, a motor module comprising multiple motors, and a driving module for driving the multiple motors in the motor module to vibrate. The control module is further configured for determining whether the vibrating information need to be delayed, and the time control system further includes a delay module for delaying the vibrating information for a time period before sending the vibrating information to the driving module to delay driving the motor module.

11 Claims, 2 Drawing Sheets

TIME CONTROL SYSTEM AND TIME CONTROL METHOD FOR MULTIPLE MOTORS

FIELD OF THE DISCLOSURE

The present disclosure generally relates to motor technologies, and more particularly, to a time control system and a time control method for multiple motors.

BACKGROUND

With the development of mobile communication technologies, mobile electronic devices such as mobile phones, tablet computers, or the like, are used more and more widely. Mobile electronic devices generally use vibrating motors for generating vibration feedback. Some of the mobile electronic devices may include multiple motors to improve vibration performance thereof, in this circumstance, a running time sequence of the multiple motors should be controlled to enable the multiple motors to operate as required to produce some desired vibration effect.

Therefore, it is necessary to provide a time control system and a time control method for multiple motors.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and an embodiment thereof.

Figure 1:
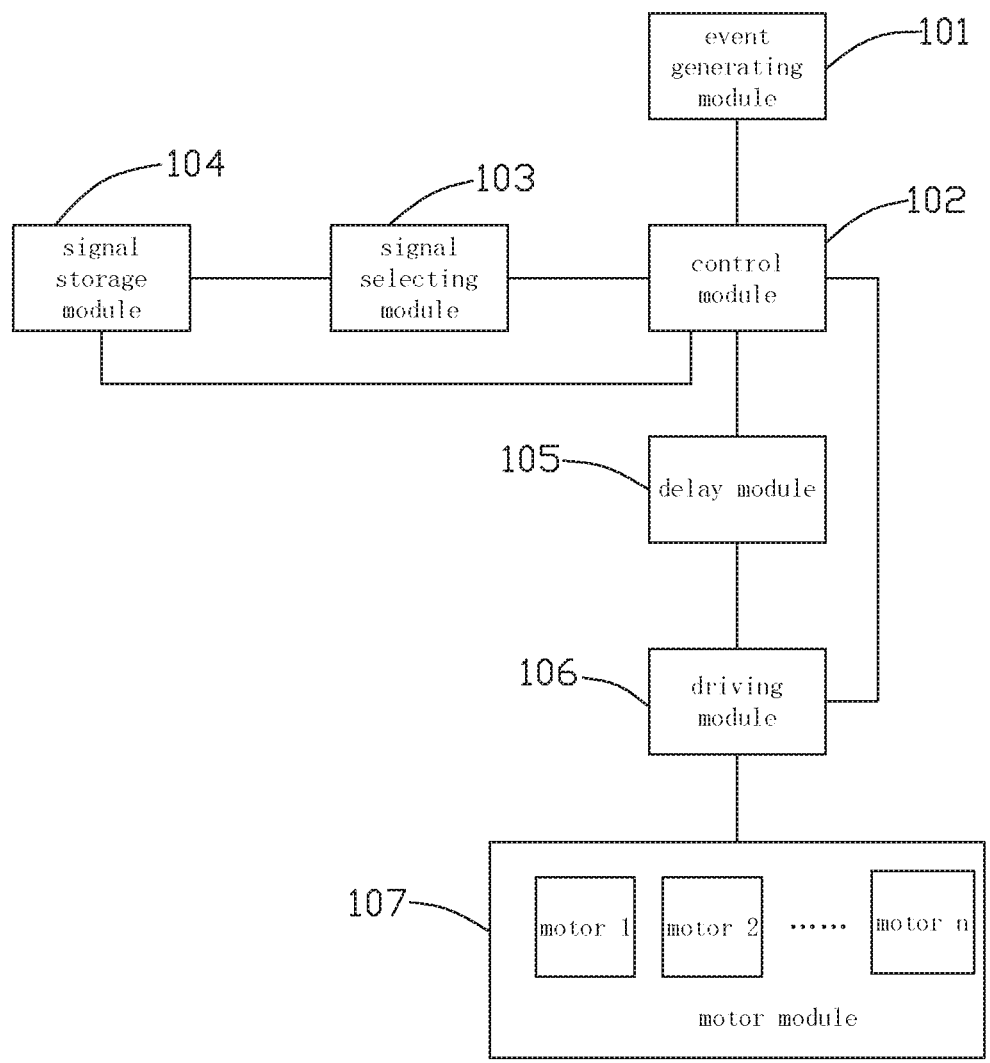
FIG. 1 is a block view of a time control system for multiple motors according to an exemplary embodiment of the present disclosure.

Referring to FIG. 1, a time control system for multiple motors according to an embodiment of the present disclosure includes an event generating module 101, a control module 102, a signal selecting module 103, a delay module 105, a driving module 106, and a motor module 107. The control module 102 is electrically coupled to the event generating module 101; the signal selecting module 103, the delay module 105 and the driving module 106 are electrically coupled to the control module 102. The motor module 107 is electrically coupled to the driving module 106, and in the present embodiment, the motor module 107 includes multiple motors such as vibrating modules.

The time control system may further include a signal storage module 104 electrically coupled to the signal selecting module 103; in the present embodiment, the signal storage module 104 may also be electrically coupled to the control module 102 directly.

When an event or a request occurs, the event generating module 101 generates information corresponding to the event or request, i.e., event information, and then transfers the event information to the control module 102. The event information includes but is not limited to event type information, event-related vibration information, and information about whether vibration needs to delayed.

The event type information indicates which type of event occurs, for example, the event type information may indicates the event is a non-instant event such as arrival of alarm time, calendar reminder, or the like; or an instant event such as opening an application, a video or a game by a user, or a trigger event raised by a non-manual operation such as a scene of a video. The event in the present disclosure is defined as requiring multiple motors to start up or be enabled in a certain time sequence. For example, during a video is playing, when different scenes are switched, the multiple motors need to be controlled such that the enabled motors under different scenes are different, for example, a first motor and a second motor are controlled to vibrate in sequence. When the above-defined event which requires the multiple motors to start up in sequence occurs, the event generating module 101 is triggered to transfer event information to the control module 102.

The control module 102 receives the event information transferred by the event generating module 101, and then provides an event command to the signal selecting module 103. The event command may include event type information and event-related vibration information which are analyzed and obtained from the event information by the control module 102. The signal selecting module 103 reads out vibrating information corresponding to the event from the signal storage module 104 according to the event command; the vibrating information includes but is not limited to vibrating type information, vibrating intensity information and a vibrating duration time corresponding to the event. The vibrating information may include a plurality of vibrating signal for driving the multiple motors to vibrate. The vibrating intensity information indicates variation of vibrating intensity required by the event, and the vibrating duration time refers to a time length of a certain one of the motors or several motors to perform vibration under a desired vibrating intensity.

During analysis of the event information, the control module 102 may also extract information about whether the vibration needs to delayed, and based on the extracted information, the control module 102 may further determine which of the vibrating signals in the vibrating information transmitted by the signal selecting module 103 need to be delayed, and which of the vibrating signals do not need to be delayed. Furthermore, the control module 102 sends the vibrating signals which need to be delayed to the delay module 105, and sends the vibrating signals which do not need to be delayed to the driving module 106.

The driving module 106 drives the motor module 107 to perform vibration according to the received vibrating signals. In the present embodiment, the driving module 106 may amplify the driving signals to obtain driving signals for driving the motors in the motor module 107, and then transmit the driving signals to the motor module 107. For example, the driving module 106 may include a plurality of driving units electrically coupled to the motors of the motor module 107 respectively. Part of the driving units are connected to the delay module 105, and are configured to receive the vibrating signals which are delayed by the delay module 105 and drive the corresponding motors to vibrate; the rest part of the driving units are connected to the control module 102 directly, and are configured to receive the vibrating signals which do not need to be delayed from the control module 102 and drive the corresponding motors to vibrate.

In the above time control system for multiple motors, the control module 102, based on the event information, determines vibrating sequence of the multiple motors in the event, and drive the motors to vibrate in an appropriate time sequence. As such, the time control system for the multiple motors has advantages including high efficiency and fast response, and can also enable the multiple motors to provide various vibrating effect.

Figure 2:
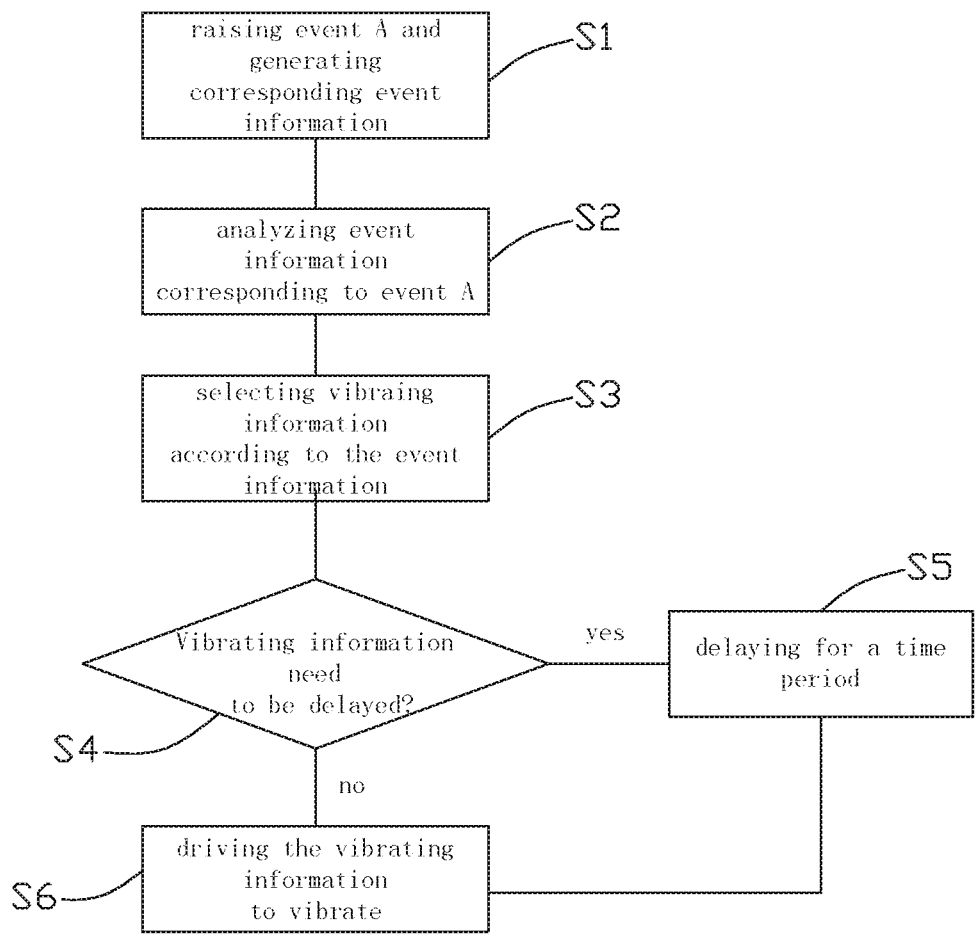
FIG. 2 is a flow chart of a time control method for multiple motors according to an exemplary embodiment of the present disclosure.

Based on the time control system as described above, the present disclosure further provide a time control method for multiple motors. FIG. 2 is a flow chart of a time control method for multiple motors according to an exemplary embodiment of the present disclosure. The time control method mainly includes steps as follows.

Step S1, an event generating module 101 raises event A, and generates event information corresponding to the event A, i.e., event information;

Step S2, an control module 102 analyzes the event information corresponding to the event A;

Step S3, an signal selecting module 103 selects vibrating information required by the event A;

Step S4, the control module 102 determines whether the vibrating information needs to be delayed;

Step S5, a delay module 105 delays the vibrating information for a time period when the vibrating information needs to be delayed, and then sends the vibrating information to a driving module 106 to drive a motor module 107 to vibrate;

Step S6, the control module 102 sends the vibrating information to the diving module 106 directly when the vibrating information do not need to be delayed, to drive the motor module 107 to vibrate.

In the present embodiment, the vibrating information includes a plurality of vibrating signals for controlling multiple motors in the motor module 107 respectively. The control module 102 determines, based on the extracted information about whether the vibration needs to delayed, which of the vibrating signals in the vibrating information need to be delayed, and which of the vibrating signals do not need to be delayed; and then the control module 102 sends the vibrating signals which need to be delayed to the delay module 105. The delay module 105 delays the vibrating signals for a time period before sending the vibrating signals to the driving module 106, and the driving module 106, after receiving the vibrating signals from the delay module 105, drives the corresponding motors in the motor module 107 to vibrate. Moreover, the control module 102 also sends the vibrating signals which do not need to be delayed to the driving module 106 directly, and the driving module 106 drives the corresponding motors in the motor module 107 to vibrate. As such, the multiple motors in the motor module 107 are controlled to vibrate in an appropriate time sequence.

An example is taken in the following description to describe the time control method as provided in the present disclosure.

In the example, an event A occurs, which is variation of motors under vibrating in a same event. An event type of the event A is relevant to that a motor under vibrating is switched from a motor 2 to a motor 1. The motor 1 and the motor 2 have a vibrating intensity and a vibrating duration time of their own.

When the event A occurs, the event generating module 101 generates event information corresponding to the event A, and then sends the event information to the control module 102. The control module 102 obtains from the event information that the event A occurs, and then provides a control command to the signal selecting module 103. The signal selecting module 103 reads out vibrating information of the motor 1 and the motor 2 corresponding to the event A from the signal storage module 104, and feeds back the vibrating information to the control module 102. The control module 102 determines, based on the extracted information about whether the vibration needs to delayed, whether the vibrating information of motor 1 and motor 2 need to be delayed. When the control module 102 determines that the vibrating information of the motor 1 needs to be delayed, and the vibrating information of the motor 2 do not need to be delayed, the control module 102 then sends the vibrating information of the motor 1 to the delay module 105. The delay module 105 delays the vibrating information of the motor 1 for a time period before the vibrating information of the motor 1 is sent to the driving module 106, and the driving module 106 drives the corresponding motor 1 to vibrate after receiving the vibrating information of the motor 1 from the delay module 105. Moreover, the control module 102 also sends the vibrating information of the motor 2 to the driving module 106 directly, and the driving module 106 drives the motor 2 to vibrate upon receiving the vibrating information of the motor 2 from the control module 102. As such, the motor 2 is driven to vibrate first, and the motor 1 is driven to vibrate after delaying a time period. Therefore, the motor 1 and the motor 2 are capable of cooperatively providing various vibration effect.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A time control system for multiple motors, comprising:
   an event generating module for generating event information corresponding to an event;
   a control module for analyzing the event information;
   a signal selecting module for selecting vibrating information according to the event information;
   a motor module comprising multiple motors; and
   a driving module for driving the multiple motors in the motor module to vibrate;
   wherein the control module is further configured for determining whether the vibrating information need to be delayed; the time control system further comprises a delay module, the delay module is configured for delaying the vibrating information for a time period before sending the vibrating information to the driving module to delay driving the motor module, the control module determines vibrating sequence of the multiple motors in the event, and the driving module drives the motors to vibrate in an appropriate time sequence.

2. The time control system of claim 1, wherein the control module is further configured for providing the vibrating information directly to the driving module for driving the motor module without delaying.

3. The time control system of claim 1, further comprising a signal storage module for storing the vibrating information as required by the event.

4. The time control system of claim 3, wherein the driving module comprises multiple driving units, each of the driving units is configured for driving a respective motor in the motor module.

5. The time control system of claim 4, wherein the vibrating information comprises a plurality of vibrating signals for driving the motors to vibrate.

6. The time control system of claim 5, wherein the control module determines which of the vibrating signals need to be delayed and sends the vibrating signals needing to be delayed to the delay module for delaying driving the motors, and determines which of the vibrating signals do not need to be delayed and sends the vibrating signals do not need to be delayed to the driving module directly.

7. A time control method for multiple motors, comprising:
  generating, by an event generating module, event information corresponding to an event;
  analyzing, by a control module, the event information corresponding to the event;
  selecting, by a signal selecting module, vibrating information corresponding to the event;
  determining, by the control module, whether the vibrating information need to be delayed, determining vibrating sequence of the multiple motors in the event; and
  delaying, by a delay module, the vibrating information for a time period before sending the vibrating information to a driving module for delay driving a motor module to vibrate;
  driving, by the driving module, the multiple motors to vibrate in an appropriate time sequence.

8. The time control method of claim 7, further comprising:
  sending, by the control module, the vibrating information directly to the driving module for driving the motor module without delaying.

9. The time control method of claim 8, wherein the event information comprises event type information, vibrating information corresponding to the event, and information about whether vibration needs to delayed.

10. The time control method of claim 9, wherein the driving module comprises multiple driving units each for driving a respective motor in the motor module.

11. The time control method of claim 10, wherein the determining whether the vibrating information need to be delayed comprises:
  extracting, by the control module, the information about whether vibration needs to delayed from the event information; and
  determines, by the control module based on the information about whether the vibration needs to delayed, which of the vibrating signals in the vibrating information need to be delayed, and which of the vibrating signals do not need to be delayed.

* * * * *